US012528306B2

(12) United States Patent
Wilflingseder

(10) Patent No.: US 12,528,306 B2
(45) Date of Patent: Jan. 20, 2026

(54) FIXING DEVICE FOR A SELF-INKING STAMP

(71) Applicant: COLOP STEMPELERZEUGUNG SKOPEK GESELLSCHAFT M.B.H. & CO. KG., Wels (AT)

(72) Inventor: Johann Wilflingseder, Dorf an der Pram (AT)

(73) Assignee: COLOP STEMPELERZEUGUNG SKOPEK GESELLSCHAFT M.B.H. & CO. KG., Wels (AT)

( * ) Notice: Subject to any disclaimer, the term of this patent is extended or adjusted under 35 U.S.C. 154(b) by 0 days.

(21) Appl. No.: 18/580,792

(22) PCT Filed: Aug. 19, 2022

(86) PCT No.: PCT/AT2022/060289

§ 371 (c)(1),
(2) Date: Jan. 19, 2024

(87) PCT Pub. No.: WO2023/019285

PCT Pub. Date: Feb. 23, 2023

(65) Prior Publication Data

US 2025/0121621 A1 Apr. 17, 2025

(30) Foreign Application Priority Data

Aug. 20, 2021 (AT) .................................. 50679/2021

(51) Int. Cl.
*B41K 1/02* (2006.01)
*B41K 1/40* (2006.01)

(52) U.S. Cl.
CPC . *B41K 1/02* (2013.01); *B41K 1/40* (2013.01)

(58) Field of Classification Search
CPC ... B41K 1/02; B41K 1/40; B41K 1/00; B41K 1/006; B41K 1/54; B41K 3/00
See application file for complete search history.

(56) References Cited

U.S. PATENT DOCUMENTS 6,302,022 B1 10/2001 Shih
7,021,211 B1 * 4/2006 Shih .......................... B41K 1/36
101/368

(Continued)

FOREIGN PATENT DOCUMENTS

AT 513900 B1 * 8/2018 ............... B41K 1/36
AT 523250 A1 6/2021

(Continued)

OTHER PUBLICATIONS

International Search Report in PCT/AT2022/060289, mailed Dec. 2, 2022.

(Continued)

*Primary Examiner* — Christopher E Mahoney
*Assistant Examiner* — Marissa Ferguson-Samreth
(74) *Attorney, Agent, or Firm* — Collard & Roe, P.C.

(57) ABSTRACT

A fixing device for a self-inking stamp includes a stop for a contact surface of a housing of the self-inking stamp and a latching element connected to the stop, wherein a front face of the latching element is designed for latching on an inner face of an operating part of the self-inking stamp. The latching element is also designed to rest, with a rear face of the latching element opposite the inner face of the operating part, on the housing of the self-inking stamp fixed using the fixing device. Also, a stamp device, includes the fixing device and a self-inking stamp having an operating part, a housing and an imprinting unit, wherein the self-inking stamp is fixed using the fixing device.

12 Claims, 7 Drawing Sheets

(56) References Cited

U.S. PATENT DOCUMENTS

| | | | | |
|---|---|---|---|---|
| 7,921,772 | B2 * | 4/2011 | Shih | B41K 1/40<br>101/334 |
| 11,104,168 | B2 | 8/2021 | Sillipp et al. | |
| 11,220,124 | B2 | 1/2022 | Zindl et al. | |
| 2011/0277647 | A1 | 11/2011 | Zindl et al. | |
| 2014/0230671 | A1 * | 8/2014 | Mitsuya | B41K 1/006<br>101/334 |
| 2015/0352876 | A1 | 12/2015 | Faber | |
| 2019/0381818 | A1 * | 12/2019 | Chen | B41K 1/38 |
| 2021/0387466 | A1 | 12/2021 | Sillipp et al. | |

FOREIGN PATENT DOCUMENTS

| | | | | |
|---|---|---|---|---|
| CN | 207984359 | U | 10/2018 | |
| CN | 112976841 | A | 6/2021 | |
| EP | 0 873 245 | B1 | 10/1999 | |
| EP | 1 796 909 | B1 | 7/2013 | |
| EP | 2 634 005 | B1 | 2/2015 | |
| RU | 2015135519 | A | 3/2017 | |
| WO | 2004/091923 | A1 | 10/2004 | |
| WO | WO-2006029422 | A2 * | 3/2006 | B41K 1/36 |
| WO | 2006/089335 | A2 | 8/2006 | |
| WO | 2010/085828 | A2 | 8/2010 | |
| WO | 2016/197172 | A1 | 12/2016 | |
| WO | WO-2023064969 | A1 * | 4/2023 | B41K 1/02 |
| WO | WO-2024164039 | A1 * | 8/2024 | B41K 1/12 |

OTHER PUBLICATIONS

Austrian Office Action dated Mar. 25, 2022 in Austrian Application No. A 50679/2021, with attached Search Report, with English translation of relevant parts.

PCT—International Preliminary Report on Patentability of International Application No. PCT/AT2022/060289, Dated Feb. 29, 2024 (English translation).

Russian Office Action in Russian Application No. 2024103170/28 dated Oct. 10, 2025.

* cited by examiner 12
34
14
36
3
28

12
34
36
14
3
28

18
34
12
33
13
27
24
3
30

12
34
4
2
22
5
6
PRESS

FIXING DEVICE FOR A SELF-INKING STAMP

CROSS REFERENCE TO RELATED APPLICATIONS

This application is the National Stage of PCT/AT2022/060289 filed on Aug. 19, 2022, which claims priority under 35 U.S.C. § 119 of Austrian Application No. A 50679/2021 filed on Aug. 20, 2021, the disclosure of which is incorporated by reference. The international application under PCT article 21(2) was not published in English.

BACKGROUND OF THE INVENTION

1. Field of the Invention

The invention relates to a fixing device for a self-inking stamp comprising a stop for a contact surface of a housing of the self-inking stamp and a latching element connected to the stop, wherein a front face of the latching element is designed for latching on an inner face of an operating part of the self-inking stamp. Furthermore, the invention relates to a stamp device comprising the fixing device and a self-inking stamp.

2. Description of the Related Art

Self-inking stamps known in the prior art typically comprise an operating part, a housing and an imprinting unit. In this case, the imprinting unit comprises a stamp pad provided in a pad container for inking a stamp plate. By pressing the operating part, the stamp plate rotates 180° and thus produces a stamp imprint.

In the closed position, the self-inking stamp is fixed using the fixing device, so that the displacement of the operating part with respect to the housing is limited. A return spring provided in the operating part is in the compressed state.

In the rest position (also inking position), the self-inking stamp is not fixed using the fixing device and the return spring is relieved. In the rest position, the housing of the self-inking stamp is arranged predominantly outside the operating part of the self-inking stamp. In the operational state of the self-inking stamp, the housing is accordingly arranged below the operating part, and the side of the stamp plate used for a stamp imprint is oriented upwards.

In the printing position, the self-inking stamp is not fixed using the fixing device and a compressive force acts on the operating part of the self-inking stamp, so that the housing is located inside the operating part and the return spring is compressed. The side of the stamp plate used for a stamp imprint points downwards in the operational state of the self-inking stamp and produces an imprint on a suitable substrate.

In general, fixing devices and stamps, in particular self-inking stamps that are fixed with a fixing device are known in the prior art. Most of the disclosures describe fixing devices that can be attached to and removed from a stamp.

WO 2016/197172 A1 describes a cover which is pushed over the narrow side onto a compressed stamp, the cover being held on a holding element of the housing.

EP 2 634 005 B1 and EP 1 796 909 B1 describe a covering cap which is connected to the axle or to the axle stub of the imprinting unit of a hand stamp via a clamping device. In the compressed state of the hand stamp, the cover cap of EP 2 634 005 B1 is latched to the imprinting unit via latching elements.

EP 0 873 245 B1 discloses a latching of a cover with a stamp on its outer surface.

In most of the disclosures described in the prior art, which describe a latching of a fixing device with a stamp, the releasing of the latching and the pulling off of the fixing device take place by the application of tensile force. This action of force can lead to component failure, in particular to irreversible deformations or fatigue fractures of latching elements, so that it is no longer possible to close the stamp.

AT 523250 A1 describes a cover for a stamp, in particular a self-inking stamp, on which two opposite operating elements are arranged. Each operating element comprises a latching element, such as a latching hook, which, in the closed position, is latched to an operating part of the stamp. By compressing the operating elements, the latching hook is pressed inwards. By applying pressure, the latching of the cover with the operating part of the stamp is released and the cover can be pulled off the stamp without force. At the same time, the stamp fixed with the cover changes into its rest position under the action of the spring force of the return spring. However, it is disadvantageous that the latching element loosens relatively easily by itself and unintentionally under the action of the return spring, for example due to material fatigue after prolonged use or because the material becomes softer and thus more flexible due to higher temperatures, for example during delivery and transport of the new stamp.

The fixing devices used in the prior art as well as housings and operating parts of self-inking stamps are often made of a plastic with a maximum constant use temperature of approximately 70 to 90° C. When a self-inking stamp fixed with a fixing device is stored at an elevated temperature, for example during transport, the components soften in the glass transition or melting range of the plastics. This leads to a significant decrease in mechanical properties, in particular strength and stiffness. In the known devices, this is accompanied by a considerable impairment of the locking capability of the fixing device. The latching of the fixing device with the operating part can often not withstand the oppositely directed return force of the return spring of the self-inking stamp and is pressed relatively easily into a provided free space between the fixing device and the housing of the self-inking stamp, so that the latching is released.

SUMMARY OF THE INVENTION

It is therefore an object of the invention to provide a fixing device for a self-inking stamp comprising an improved locking capability and retaining this with a higher reliability even during prolonged use and during storage in the entire constant use temperature range of the stamp device.

The invention relates to a fixing device for a self-inking stamp, characterized in that the latching element is designed not only to latch with the front face of the latching element on the inner face of the operating part of the self-inking stamp, but also to rest with a rear face of the latching element, opposite the inner face of the operating part, against the housing of the self-inking stamp fixed using the fixing device. The invention further relates to a stamp device, wherein the self-inking stamp is fixed using the fixing device.

The invention is based on the finding that the provision of the latching element, which rests with its rear face against the outer side of the housing of the self-inking stamp fixed using the fixing device, considerably improves the reliable locking capability of the fixing device over the entire constant use temperature range of the stamp device.

All disclosed embodiments of the present invention are interlinked, and each disclosed embodiment and/or each disclosed characteristic feature can be combined with each other and also as any combination of two or more embodiments and/or embodiment features.

For the purposes of this disclosure, indications such as “top”, “bottom”, “above”, “below”, etc. refer to the intended operating condition of the self-inking stamp to produce an imprint on a suitable substrate to which the stamp ink adheres (for example, paper).

The fixing device comprises a latching element. A section of this latching element may be easily deformable due to an exposed position, for example. The latching element latches with its front face on the inner face of the operating part of the self-inking stamp, wherein a free space can be provided, for example, in the form of a groove on the inner face of the operating part, into which the latching element is accommodated. By forming a form-fitting connection between the latching element and the operating part, the self-inking stamp is fixed in the closed position by the fixing device. The latching element is connected to the stop of the fixing device, on which, in use, the contact surface of the housing of the self-inking stamp rests in the closed position. In this closed position, the front face of the latching element rests against the inner face of the operating part of the self-inking stamp. In addition, the rear face of the latching element rests against the outer side of the housing. The latching element is thus in two-sided contact with the self-inking stamp. Accordingly, no free space is provided between the rear face of the latching element and the housing of the self-inking stamp, in which the latching element could possibly escape when subjected to pressure or softened by an increase in temperature if it can no longer withstand the return force of the return spring on its own. Rather, the latching element is clamped between the operating part and the housing of the self-inking stamp. Therefore, in order to release the latching, not only the latching element, but also the housing is deformed. The locking capability of the fixing device is thereby considerably improved.

The fixing device can be made of plastic, such as acrylonitrile-butadiene-styrene (ABS), since this thermoplastic has good mechanical properties and, in particular, good elasticity, which is advantageous for deforming or bending the fixing device, in particular the latching element. The housing of the self-inking stamp is also made of a plastic, which can be transparent for aesthetic reasons. Due to their transparency as well as high strength and impact resistance, the thermoplastics polycarbonate (PC) or polymethyl methacrylate (PMMA), for example, are suitable for this, whereby PMMA proves to be very suitable, especially due to its excellent scratch resistance. It has been found that by forming the two-sided contact of the latching element with the self-inking stamp, the locking capability of the fixing device according to the invention is considerably improved in the entire constant use temperature range of the plastics used in the fixing device and the self-inking stamp, i.e. even at elevated temperature.

The latching element of the fixing device may comprise a latching hook to further improve the holding force of the fixing device. The latching hook can be arranged on the front face of the latching element in the exposed section thereof, so that the latching hook latches in the closed state in a latching nose provided in the interior of the operating part of the self-inking stamp. Due to the contact surface of the latching hook with the inner face of the operating part, which is arranged normal to the return force of the return spring, a particularly stable form-fitting connection is formed and the locking capability of the fixing device is particularly high.

The rear face of the latching element of the fixing device may further comprise a support element. In the closed position, the support element rests against the outer side of the housing. The support element can be formed in different geometric shapes, such as, for example, in the form of a circle, an ellipse, or in an elongated shape, in particular in the form of a support rib. On the one hand, the local stiffness of the fixing device is increased by the support element provided on the latching element. As a result, it is possible to reduce the wall thickness of the latching element in order to save material. If the support element extends over the area between the stop for the contact surface of the housing of the self-inking stamp and the latching element, this area can also be made with a thinner wall thickness by stiffening the support element. Furthermore, by providing a support element, the contact surface between the latching element and the self-inking stamp is reduced. Reducing the contact surface does not impair the locking capability of the fixing device, but the removal of the fixing device from the self-inking stamp is made considerably easier by the reduced frictional force due to the reduced contact surface.

Instead of providing a support element on the latching element, or in addition thereto, a support element may be provided on the outer side of the housing of the self-inking stamp. This support element can be formed in different geometric shapes, such as, for example, in the form of a circle, an ellipse, or in an elongated shape, in particular in the form of a support rib. On the one hand, the support element increases the local stiffness of the housing. On the other hand, in the closed position, the support element rests against the rear face of the latching element of the fixing device and thereby reduces the contact surface, so that the removal of the fixing device from the self-inking stamp is considerably simplified by the reduced frictional force.

Providing a support element on the latching element of the fixing device has the advantage over providing a support element on the housing of the self-inking stamp that no adaptation of the mould is required for the production of the housing, which takes place, for example, by means of injection moulding. Conversely, a support element provided on the latching element of the fixing device can scratch the housing when the fixing device is pulled off the self-inking stamp. This is prevented by providing the support element instead on the housing of the self-inking stamp, so that this embodiment is advantageous for aesthetic reasons.

The rear face of the latching element of the fixing device may comprise a roller. This can be provided instead of a support element. An axis of rotation of the roller is normal to a direction in which the fixing device is pulled off the self-inking stamp. Due to the reduced friction (rolling friction instead of sliding friction), the removal of the fixing device is considerably simplified and can be done by a rolling movement. Thus, the occurrence of sliding friction is reduced or completely prevented, so that scratching of the outer side of the housing of the self-inking stamp can be avoided. In an advantageous embodiment, the roller is provided at the lower end of the latching element, i.e. below the exposed section of the latching element. Thus, the release of the latching by pressurization is not impaired by the presence of the roller. The roller further reduces the contact surface between the fixing device and the self-inking stamp in the closed position. There may also be only one line contact along a height of the cylindrical roller with the outer side of the housing of the self-inking stamp. This further simplifies the removal process. At the same time, the roller provides a sufficiently high stiffness so that, even in this embodiment, the latching element cannot easily come loose by itself and unintentionally.

The stop of the fixing device can be formed as a cover surface for covering the contact surface of the housing of the self-inking stamp. Due to the acting return force of the return spring, a high pressing force is achieved between the cover surface of the fixing device and the contact surface of the housing, so that a good seal is achieved. To cover the contact surface of the housing of the self-inking stamp, the cover surface of the fixing device may extend over the entire contact surface of the housing. This makes it possible to close the interior of the self-inking stamp in a dust-tight manner and to apply the pressing force resulting from the return force of the return spring uniformly to the contact surface of the self-inking stamp with the fixing device in the closed position. Furthermore, by completely covering the contact surface of the housing of the self-inking stamp, unwanted soiling, such as of objects, with stamp ink is avoided.

The plan view of the self-inking stamp may be, for example, round, elliptical or trapezoidal, in particular rectangular. In order, for example, to close a contact surface of the housing of the self-inking stamp well with a substantially trapezoidal, in particular rectangular, plan view, the covering surface of the fixing device can also be substantially trapezoidal, in particular rectangular, in order to completely cover the contact surface of the housing.

The fixing device may further comprise side walls. If the fixing device comprises a covering surface, the side walls abut the covering surface and stand approximately normal to the covering surface. Side walls not only improve the user-friendliness, in particular the handling of the fixing device, but also the locking capability of the fixing device, since the side walls of the fixing device partially overlap the side walls of the housing of the self-inking stamp in the closed position. As a result, the contact surface between the fixing device and the self-inking stamp is increased and the degrees of freedom of the fixing device are restricted, so that twisting and/or displacement of the fixing device relative to the self-inking stamp is reduced and the locking capability is thus further improved. In the closed position, the side walls of the fixing device may end flush with the side walls of the operating part of the self-inking stamp, so that the housing of the self-inking stamp is located entirely inside the stamp device in the closed position. This not only gives the stamp device an aesthetic appearance, but also protects the interior of the stamp device very well against the entry of dust.

If the fixing device comprises side walls, different sections of the side walls may have different heights. For example, in the case of a substantially rectangular design, the wide side walls (at the shorter sides) may have a smaller height than the longitudinal side walls (at the longer sides). As a result, a comparatively large overlap of the longitudinal side walls of the fixing device with the outer side of the housing of the self-inking stamp is achieved. This is accompanied by a corresponding different height of the side walls of the operating part with a substantially rectangular cross-sectional surface, which is higher at sections of the wide side walls than at sections of the longitudinal side walls, so that in the closed position a flush termination of the side walls of the fixing device with the side walls of the operating part of the self-inking stamp is ensured. The comparatively small height of the longitudinal side walls of the operating part makes it possible for the pad container, in which the stamp pad is located, to be arranged outside the operating part in the rest position and to be pressed out of the housing of the self-inking stamp and replaced. The comparatively high wide side walls of the operating part in turn support and protect the axial bearings of the imprinting unit, which is linearly displaceable relative to the housing, for example, by means of pin-shaped axial parts in guide grooves, which may be provided in the wide side faces of the housing of the self-inking stamp.

The fixing device may comprise two latching elements opposite to one another. In this case, the rear faces of both latching elements, which are provided for latching on the inner face of the operating part of the self-inking stamp, face one another. The provision of two mutually opposite latching elements, the rear faces of which are arranged parallel to one another and which are opposite one another, in particular with respect to a central axis of the return spring of the stamp to be fixed, is particularly advantageous for the locking capability of the fixing device, since the return force of the return spring is uniformly introduced into the fixing device via the two latching elements. In a fixing device with a substantially rectangular cover surface, two latching elements may be provided on both longitudinal sides of the cover surface. If the fixing device comprises side walls, two latching elements may be provided on both longitudinal side walls. Since the longitudinal side walls of the fixing device can naturally be deformed particularly easily in the middle, i.e. on half of the respective longitudinal side, the provision of two latching elements in the middle of the longitudinal side walls of the fixing device is particularly suitable for closing a substantially rectangular cuboid-shaped self-inking stamp. In the case of two latching elements, each of the latching elements can comprise a support element, or two support elements can be provided on the outer side of the housing of the self-inking stamp, which in the closed position rests against the respective rear faces of the latching elements. This enables a uniform release of the two-sided latching and a uniform removal of the fixing device from the self-inking stamp.

The fixing device can comprise an operating element between the stop for the contact surface of the housing of the self-inking stamp and the latching element, which operating element can be shaped approximately circularly or elliptically and/or in the form of a depression and improves the user-friendliness, since it is thus easy to see how the fixing device can be removed from the self-inking stamp. The operating element can also be arranged between the stop for the contact surface of the housing of the self-inking stamp and the exposed area of the latching element. By pressing on the operating element, the latching of the latching element on the inner face of the operating part of the self-inking stamp is released. The operating element can comprise an anti-slip device, for example in the form of grooves or symbols, in order to ensure a secure grip for the fingers. Furthermore, the operating element can be provided with an inscription (such as "push" or "press"), so that the user can immediately see at which point of the fixing device the pressure must be applied to release the latch. If the fixing device comprises side walls, the operating element may be provided on the side walls. Two mutually opposite operating elements arranged parallel to one another can also be provided, which further improves the user-friendliness, since the corresponding suitable positions for compressing the fixing device are thus easily visible.

The cover surface of the fixing device may comprise a support element on which the contact surface of the housing lies in the closed position. By providing a support element, a distance between the cover surface of the fixing device and the contact surface of the housing is ensured in the closed position. Since the side of the stamp plate used for stamp printing faces the cover surface in the closed position, the provision of this distance prevents contamination of the cover surface by stamp ink adhering to the stamp plate and scratching of the stamp plate. Four support elements can also be provided, which comprise, for example, a rectangular cross-sectional surface and are distributed at regular intervals over the perimeter of the covering surface of the housing of the self-inking stamp to be accommodated. In this embodiment, the contact surface of the housing lies evenly and firmly on the support elements, so that no movement of the housing relative to the fixing device is possible. If the fixing device comprises side walls, the support element can abut flush with the side walls, which improves the stability of the support element and simplifies production in the injection moulding process.

The cover surface of the fixing device may comprise a guide element on the side facing the self-inking stamp in the closed position. The guide element is arranged outside the contact surface of the housing to be accommodated by the stop of the fixing device, so that it is not an obstacle to the fixing of the self-inking stamp using the fixing device. The guide element has an approximately round or rectangular cross-sectional surface and, in the closed position, is accommodated in a corresponding recess of the operating part of the self-inking stamp. The action of external forces, for example during transport, can lead to a relative displacement and/or rotation of the fixing device with respect to the self-inking stamp, which can not only impair the locking capability, but can also reduce the service life of the stamp device and lead to component failure. By accommodating the guide element in the corresponding recess of the operating part, a relative displacement and/or rotation of the fixing device with respect to the self-inking stamp is prevented or at least reduced, and the locking capability of the fixing device is further improved. Furthermore, the positioning and placement of the contact surface of the housing of the self-inking stamp on the stop of the fixing device is simplified by the guide element.

The recess of the operating part, into which the guide element is accommodated in the above variant, can simultaneously be provided for guiding the housing in the operating part of the self-inking stamp. As a result, the number of recesses on the side of the operating part of the self-inking stamp facing the fixing device in the closed position is kept low. As a result, not only is a higher stiffness and strength of the operating part maintained, but due to the larger contact surface available between the operating part and the cover surface of the fixing device, the static friction force is also increased and the locking capability of the fixing device is improved accordingly.

If the fixing device comprises side walls, the guide element is naturally higher than the section of a side wall located in the immediate vicinity of the guide element, so that the accommodation of the guide element in a corresponding recess of the operating part of the self-inking stamp is not hindered by the section of the side wall. The guide element may end flush with the side wall. This not only simplifies the production in the injection moulding process, but is also advantageous for the stability of the guide element.

The cover surface of the fixing device can comprise, on the side facing the self-inking stamp in the closed position, outside the contact surface of the housing to be accommodated, in particular two, three or four guide elements, which, in the closed position, are accommodated in corresponding recesses of the operating part of the self-inking stamp. The guide elements can be distributed over the perimeter of the cover surface. In the case of a quadrangular covering surface, approximately four guide elements can be arranged in the four corner areas of the covering surface. The two, three or four guide elements largely prevent the fixing device from being displaced and/or rotated. The provision of a plurality of guide elements also simplifies the positioning and placement of the contact surface of the housing of the self-inking stamp on the stop of the fixing device. In this case, guide elements with chamfers facing one another can also be provided, which support the contact surface of the housing of the self-inking stamp in sliding into the position necessary for fixing.

BRIEF DESCRIPTION OF THE DRAWINGS

The invention is explained in more detail below with reference to descriptions of figures of preferred embodiments, to which, however, it is not to be limited. It should be noted that the figures or their components are partly illustrated out of scale for better understanding.

DETAILED DESCRIPTION OF THE PREFERRED EMBODIMENTS

Figure 1B:
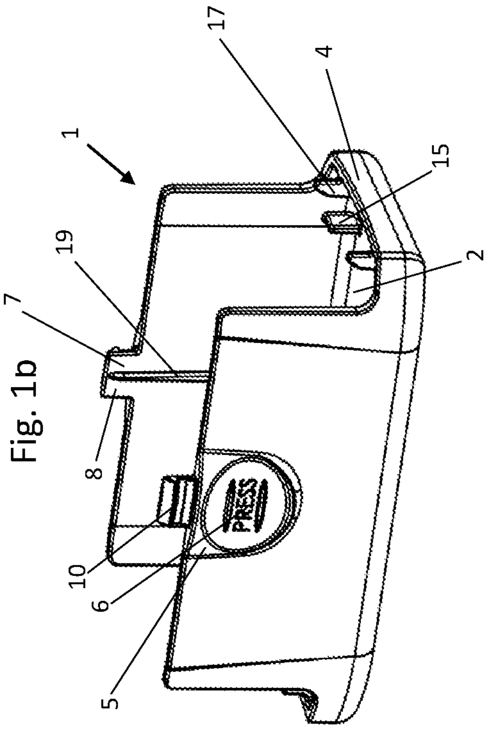
FIG. 1*a-d* show an embodiment of the fixing device according to the invention for a self-inking stamp, wherein the fixing device is illustrated in elevation view in FIG. 1*a*, laterally in FIG. 1*b*, in end view in FIG. 1*c* and in plan view in FIG. 1*d*.
Figure 1D:
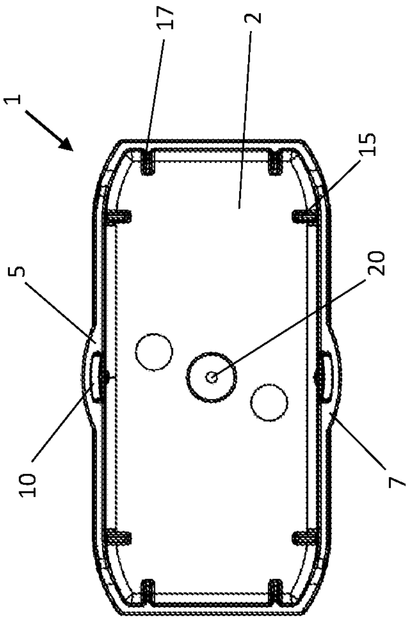
Figure 1A:
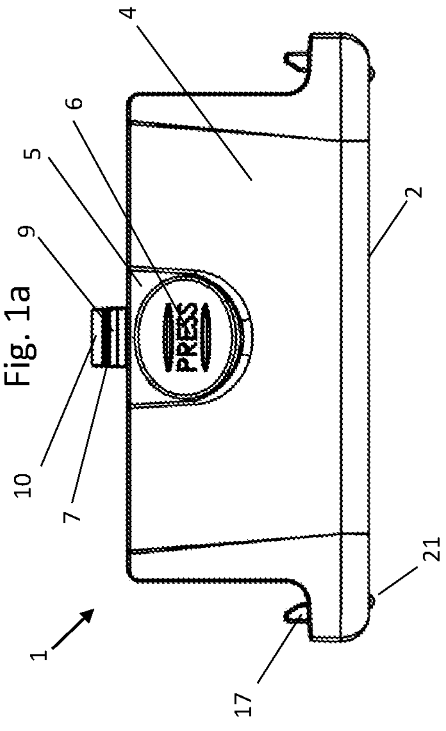
Figure 1C:
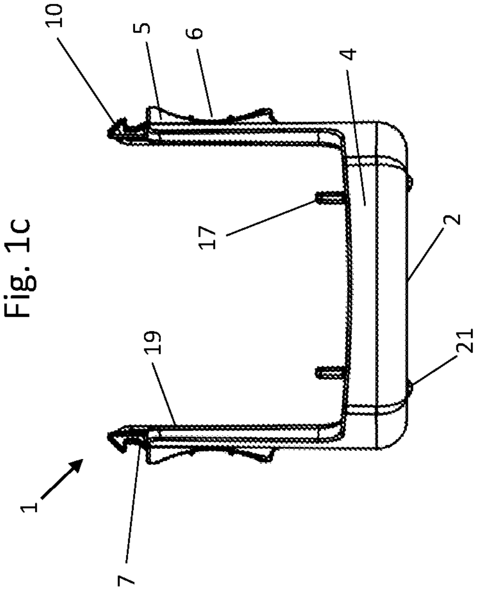

FIGS. 1*a-d* show a fixing device 1 with a substantially rectangular, plate-shaped cover surface 2 for covering a substantially rectangular cuboid-shaped self-inking stamp 3. In other geometric embodiments of the self-inking stamp 3, a corresponding adaptation of the geometric dimensions of the fixing device 1 is necessary. The fixing device 1 comprises side walls 4 that protrude in one direction and abut the cover surface 2. The longitudinal side walls 4 are higher than the wide side walls 4. Two mutually opposite operating elements 5, which comprise an operating surface 6, are provided in the middle of the outer sides of the longitudinal side walls 4. The operating surface 6 is designed in the form of a depression and comprises grooves to ensure a secure grip for the fingers and to prevent slipping. Furthermore, the operating surface 6 is provided with an inscription ("press"), so that it is immediately clear at which point of the fixing device 1 the pressure must be applied to release the latch. On the outer sides of the two longitudinal side walls 4, two mutually opposite latching elements 7 are provided, the rear faces 8 of which are arranged parallel to one another. On their front face 9, these latching elements 7 each comprise an outwardly directed latching hook 10 for hooking into a latching nose 11 of an operating part 12 of the self-inking stamp 3. Both operating elements 5 are arranged between an exposed section of the latching elements 7 and the cover surface 2 in the upper area of the outer sides of the two longitudinal side walls 4.

As can also be seen from FIG. 1*a-d*, four support elements 15 are arranged on the side of the cover surface 2 facing the self-inking stamp 3 in the closed position for placing a contact surface 13 of a housing 14 of the self-inking stamp 3. The support elements 15 extend in the direction of the side walls 4 of the fixing device 1, wherein they have a lower height than the side walls 4, so that there is no obstruction to the fixing of the self-inking stamp 3 using the fixing device 1. The provision of the supporting elements 15 ensures a distance between the cover surface 2 and the contact surface 13 of the housing 14, so that scratching of the stamp plate 16 and soiling of the cover surface 2 by stamp ink adhering to the stamp plate 16 are prevented.

The side of the cover surface 2 facing the self-inking stamp 3 in the closed position comprises four guide elements 17, which are provided outside a contact surface 13 of the housing 14 of the self-inking stamp 3, as can also be seen from FIG. 1*a-d*. The guide elements 17 end flush with the side walls 4 of the fixing device 1, being higher than the height of the immediately adjacent side walls 4 in each case, so that the fixing of the self-inking stamp 3 using the fixing device 1 is not prevented and the guide elements 17 can be accommodated in corresponding recesses 18 of the operating part 12 of the self-inking stamp 3. The cross-sectional surface of the guide elements 17 is rectangular and decreases with increasing distance from the covering surface 2. Accordingly, the guide elements 17 are chamfered, with the chamfered surfaces of two guide elements 17 each facing one another. This simplifies the positioning and placement of the contact surface 13 of the housing 14 of the self-inking stamp 3 on the support elements 15 of the fixing device 1.

On the longitudinal side walls 4 of the fixing device 1, as illustrated in FIG. 1*b*, two mutually opposite supporting ribs 19 are provided on the inner faces, which are arranged normal to the covering surface 2 and extend substantially over the entire height of the side walls 4. By providing the supporting ribs 19, the contact surface between the rear face of the latching element 7 and the outer side of the housing 14 of the self-inking stamp 3 is reduced. Instead of a planar contact surface, there is a linear contact surface, which reduces the frictional force and leads to easier removal of the fixing device 1 from the self-inking stamp 3.

As can also be seen from FIGS. 1*a-d*, the fixing device 1 is formed in one piece as an injection-moulded part, the filling of the cavity being carried out through the injection point 20, which is provided in the centre of the covering surface 2. This ensures uniform filling of the cavity. Ejection is carried out using four ejector pins arranged in the corner areas of the cover surface 2. Injection-moulded fixing device 1 is of high quality, distortion-free and free of internal stresses. The underside of the covering surface 2 comprises four feet 21 in the corner areas, which ensures stable positioning on a substrate.

Figure 2B:
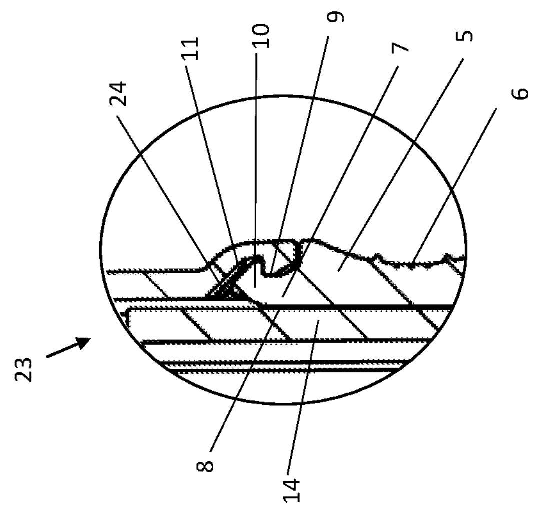
FIG. 2*a-d* show sectional illustrations of a stamp device, FIG. 2*a* showing the stamp device in the closed position, FIG. 2*b* illustrating a detail of FIG. 2*a* on an enlarged scale, and FIG. 2*c-d* showing the stamp device in the rest position.
Figure 2A:
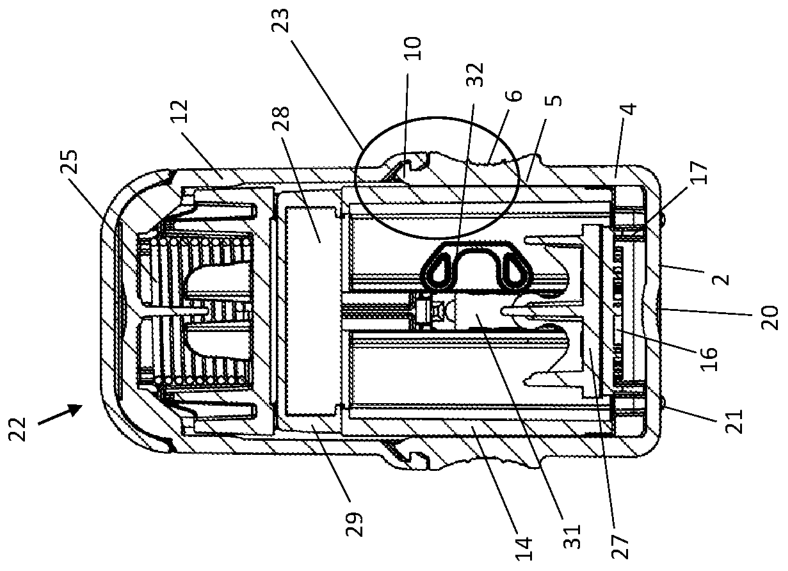
Figure 2D:
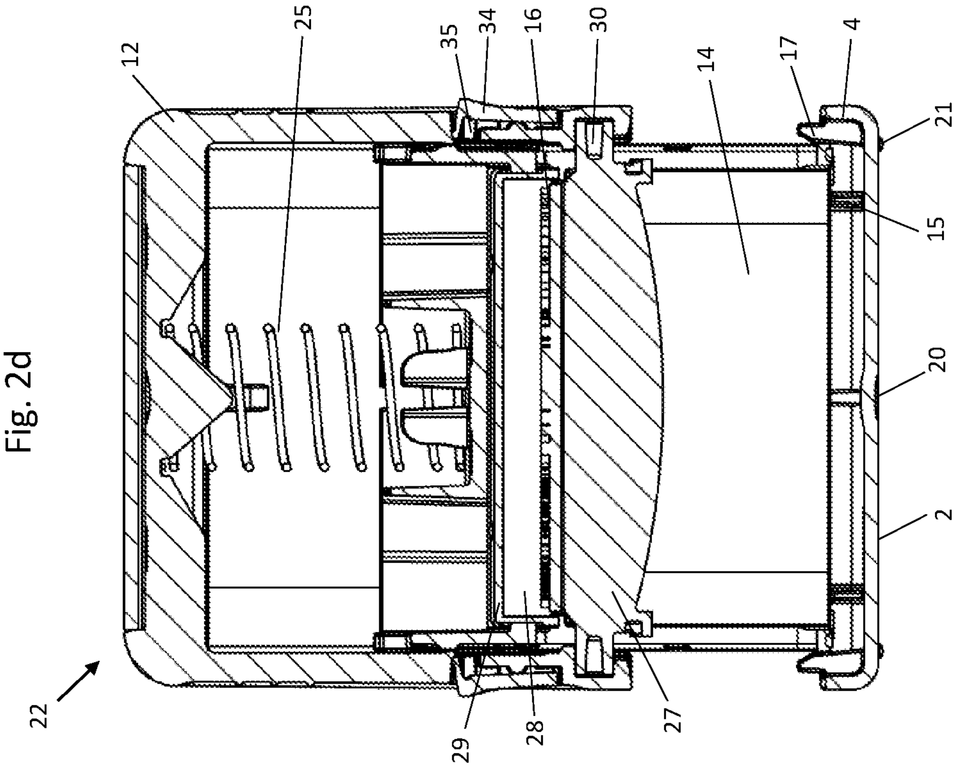
Figure 2C:
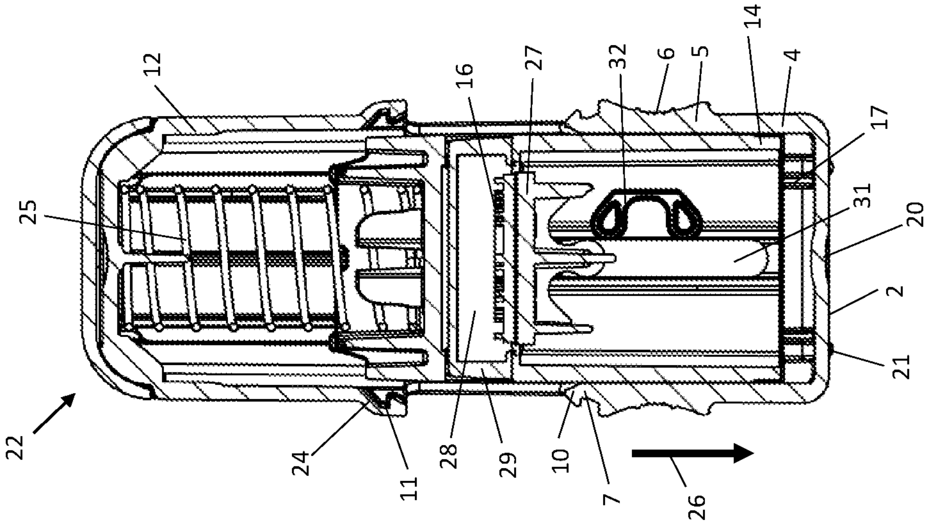

In FIG. 2*a*, a stamp device 22 comprising an embodiment of the fixing device 1 according to the invention and a self-inking stamp 3 is shown in the closed position, and in FIG. 2*c-d* in the rest position. FIG. 2*b* shows an enlarged detail 23 of FIG. 2*a*. In the interior of the longitudinal side surfaces of the operating part 12 of the self-inking stamp 3, two mutually opposite free spaces 24 are formed, which comprise a latching nose 11, in which the latching elements 7 of the fixing device 1, which are provided with latching hooks 10, latch in the closed position. In this case, the operating part 12 is curved slightly outward in the area of the free space 24, so that the free space 24 is formed only in the area of the curvature. As a result, the fixing device 1 can only be pushed onto the housing 14 of the unloaded self-inking stamp 3 in a certain position, so that an optimal closing effect is ensured. The housing 14 is pressed into the operating part 12 by a compressive force applied to the operating part 12, while the fixing device 1 is pushed onto the housing 14 in the direction of the operating part 12. The latching elements 7 of the fixing device 1 latch with their latching hooks 10 into the corresponding latching noses 11 of the operating part 12, which are provided in the free spaces 24. Through the positive connection, the self-inking stamp 3 is fixed using the fixing device 1 in the closed position, as can be seen from FIG. 2*a*. In the closed position, the pressing force between the fixing device 1 and the self-inking stamp 3, in particular the contact surface 13 of the housing 14, is increased by the acting return force of the return spring 25, which is provided in the upper area of the operating part 12.

As illustrated on an enlarged scale in FIG. 2*b*, the front face 9 of the latching element 7 rests against the inner face of the operating part 12 of the self-inking stamp 3 in the closed position. In addition, the rear face 8 of the latching element 7 rests against the outer side of the housing 14. Accordingly, no free space is provided between the rear face 8 of the latching element 7 and the housing 14 of the self-inking stamp 3, in which the latching element 7 could possibly escape when pressurized or softened by an increase in temperature if it can no longer withstand the return force of the return spring 25. The locking capability of the fixing device 1 according to the invention is considerably improved by forming two contact surfaces of the latching element 7, i.e. its front face 9 and rear face 8, with the operating part 12 and with the housing 14 of the self-inking stamp 3.

To release the latch, the user presses the two opposing operating elements 5, which are arranged on the longitudinal side walls 4 of the fixing device 1, together. As a result, the side walls 4 of the fixing device 1, on which the operating elements 5 and latching elements 7 are arranged, are pressed inwards, and the latching of the latching elements 7 with the operating part 12 of the self-inking stamp 3 is released. This allows the fixing device 1 to be subsequently removed in a forceless manner in a displacement direction 26 in order to make the stamp device 22 ready for use.

As can also be seen from FIGS. 2*a-d*, an imprinting unit 27 is arranged in the operating part 12 of the self-inking stamp 3, which is made of a plastic, for example of polyoxymethylene (POM), since this thermoplastic is characterised by high strength, hardness and stiffness and withstands shock loads well, such as those that occur when fixing the self-inking stamp 3 using the fixing device 1 or during the printing process. Mounted on the imprinting unit 27 is a stamp plate 16, which, in the rest position of the self-inking stamp 3, rests against a stamp pad 28, which is impregnated with stamp ink and is provided in a pad container 29. The side of the stamp plate 16 used for a stamp imprint is oriented upward, i.e. on the side opposite the fixing device 1 in the closed position. The imprinting unit 27 is displaceably mounted with pin-shaped axle parts 30 in guide grooves 31, which are provided in the wide side surfaces of the housing 14. To produce a stamp imprint, the imprinting unit 27 with the stamp plate 16 is moved into the printing position via a turning mechanism 32. The stamp plate 16 is rotated by 180° by the downward movement of the operating part 12, so that the side of the stamp plate 16 used for a stamp imprint faces downward in the printing position and can produce a stamp imprint.

Figure 3:
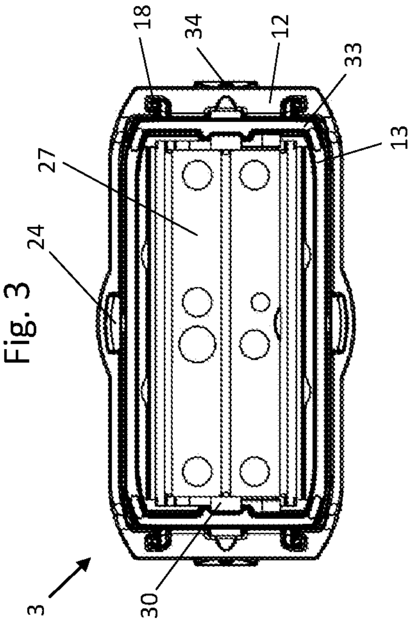
FIG. 3 shows a self-inking stamp from below (i.e. from the side facing the fixing device in the closed position).

FIG. 3 shows the self-inking stamp 3 from below (i.e. from the side facing the fixing device 1 in the closed position). Accordingly, the side of the imprinting unit 27 opposite the stamp plate 16 can be seen. The contact surface 13 of the housing 14 of the self-inking stamp 3 is partially provided with a sprayed-on rubber layer 33. This rubber layer 33 is provided on the wide side sections and partially on the longitudinal sections of the contact surface 13 of the housing 14. It prevents the self-inking stamp 3 from slipping when producing a stamp imprint.

Four recesses 18 can also be seen in FIG. 3, which are provided on the side of the operating part 12 facing the fixing device 1. These recesses 18 are designed in the form of guide strips, which are provided parallel to the guide grooves 31 for uniform guidance of the housing 14 in the operating part 12 of the self-inking stamp 3. This ensures that the housing 14 does not rotate with respect to the operating part 12 during the displacement, but only a linear movement in or against the displacement direction 26 is possible. Furthermore, the guide elements 17 of the fixing device 1 are accommodated in the recesses 18, as a result of which displacement and/or rotation of the fixing device 1 relative to the self-inking stamp 3 is prevented or at least reduced, thereby further improving the locking capability of the fixing device 1.

Figure 4:
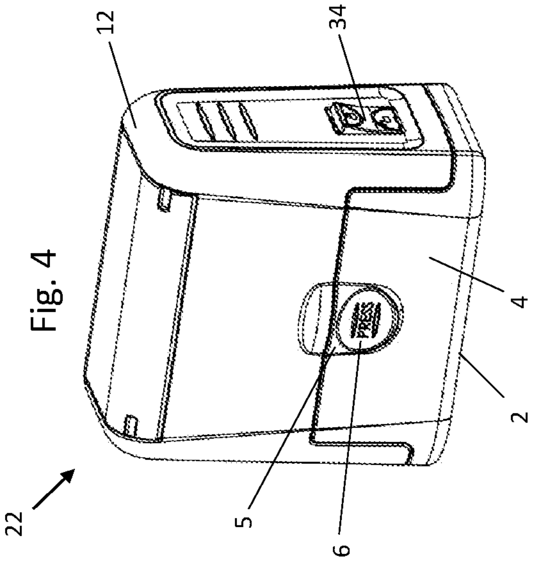
FIG. 4 shows a side view of a stamp device, wherein the self-inking stamp is fixed using the fixing device (closed position).

FIG. 4 shows the stamp device 22 according to FIG. 2*a-d* comprising the fixing device 1 and the self-inking stamp 3 in a lateral view in the closed position. A locking or blocking element 34 embodied in the form of a button is provided on the wide side surfaces of the operating part 12. By locking the self-inking stamp 3, it can be fixed in the printing position without the need for fixing using the fixing device 1. In this case, projections 35 of the locking element 34, which protrude into the interior of the housing 14 (as can be seen from FIG. 2*d*), are used to fix the housing 14, so that the return spring 25 remains in the compressed position. Unintentional release of the imprinting unit 27 is thus impossible when properly locked, and simple replacement of the stamp plate 16 is made possible.

Figure 5A:
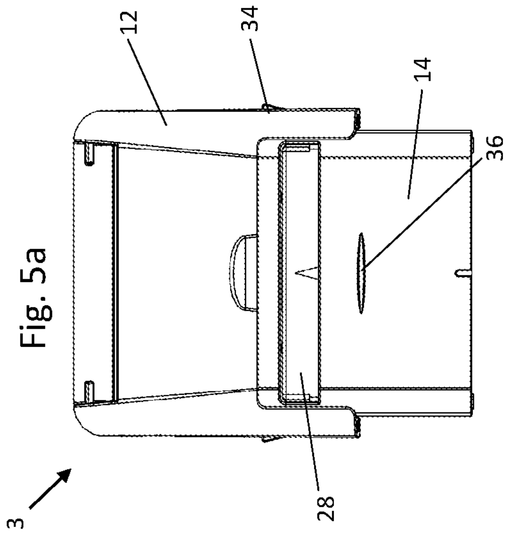
FIG. 5*a-b* show the elevation view of a self-inking stamp, the housing of which comprises a support element, wherein various embodiments of the support element are illustrated in FIG. 5*a* and FIG. 5*b*.
Figure 5B:
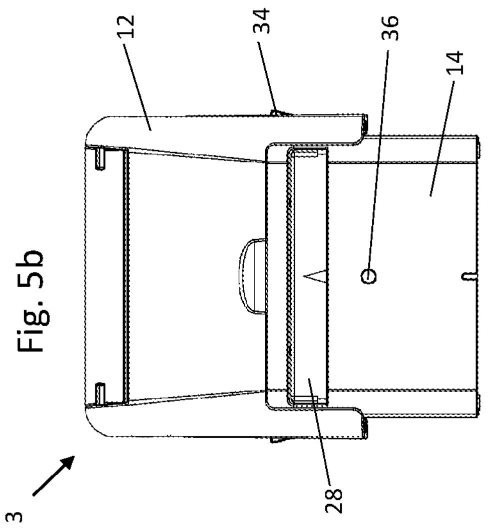

FIG. 5*a-b* shows the elevation view of two further self-inking stamps 3 in the unloaded position. Both longitudinal side surfaces of the housing 14 each comprise a support element 36 in the form of an elongated support rib (FIG. 5*a*) or in the form of a circle (FIG. 5*b*). These support elements 36 can be provided instead of the support ribs 19 of the fixing device 1. Each of the support elements 36 is positioned such that, in the closed position, it rests against the rear face 8 of a latching element 7 of the fixing device 1. As a result, the contact surface between the latching element 7 and the housing 14 is reduced and a linear or punctiform contact surface is formed, so that the removal of the fixing device 1 from the self-inking stamp 3 is considerably simplified by the reduced frictional force.

Figure 6B:
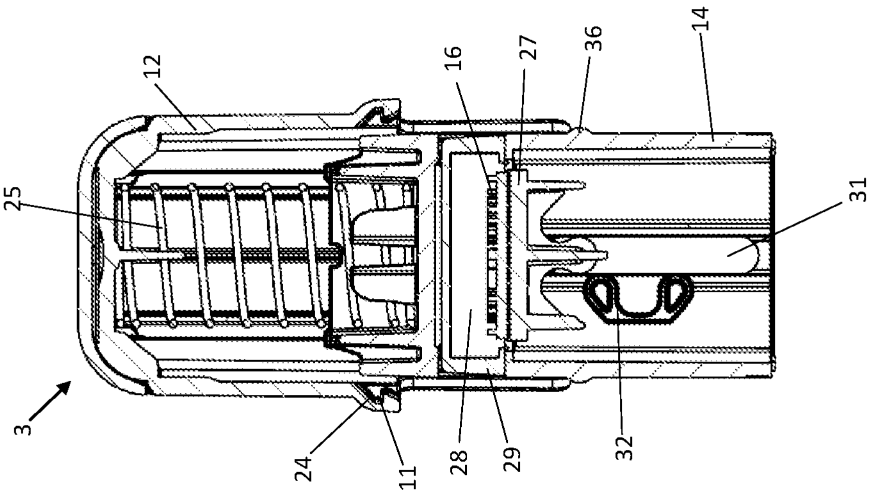
FIG. 6*a-b* show sectional illustrations of a self-inking stamp, the housing of which comprises a support element, wherein various embodiments of the support element are illustrated in FIG. 6*a* and FIG. 6*b*.
Figure 6A:
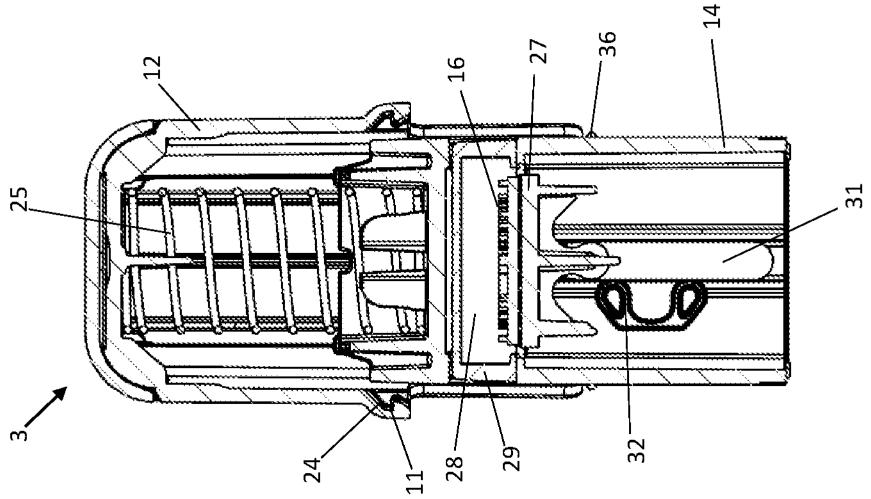
Figure 7B:
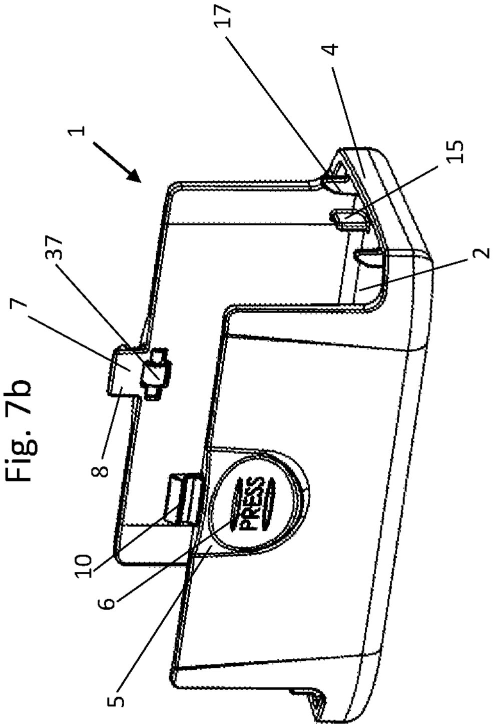
FIG. 7*a-d* show a further embodiment of the fixing device according to the invention for a self-inking stamp, wherein the fixing device is illustrated in a sectional illustration of the plan view in FIG. 7*a*, laterally in FIG. 7*b*, in a sectional illustration of the end view in FIG. 7*c* and in plan view in FIG. 7*d*.
Figure 7D:
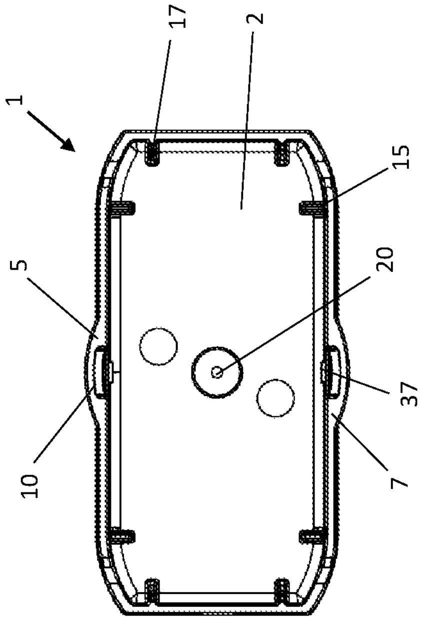
Figure 7A:
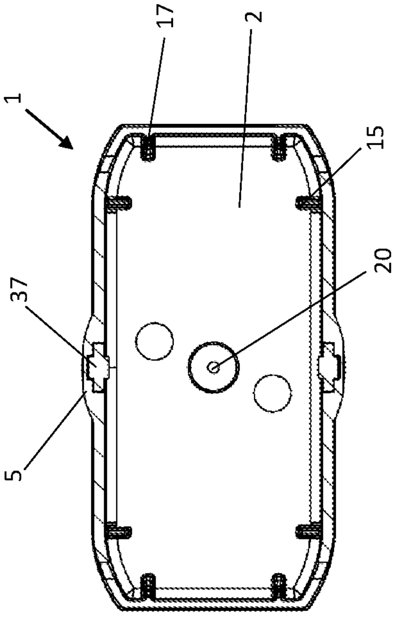
Figure 7C:
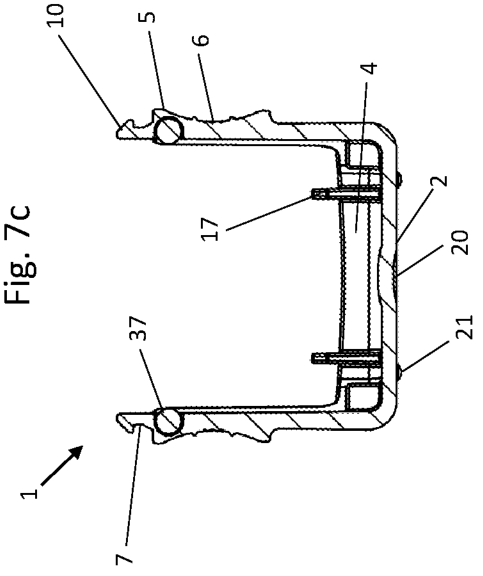

FIGS. 6*a-b* show sectional illustrations of the embodiments of the self-inking stamp illustrated in FIGS. 5*a-b*. The embodiment of the support element 36 shown in FIG. 5*a* in the form of an elongated support rib in FIG. 6*a* and the embodiment of the support element 36 shown in FIG. 5*b* in the form of a circle in FIG. 6*b* are each illustrated in a lateral view.

FIGS. 7*a-d* show a fixing device 1 similar to the embodiment shown in FIGS. 1*a-d*. The difference is that instead of supporting ribs 19, the fixing device 1 of FIGS. 7*a-d* comprises two opposing rollers 37. These rollers 37 are each arranged at the lower end of two mutually opposite latching elements 7, i.e. below exposed sections of the latching elements 7. An axis of rotation of the roller 37 is normal to a removal direction 26 of the fixing device 1 from a self-inking stamp 3, so that the removal can be carried out by a roller movement and scratching of a housing 14 of the self-inking stamp 3 can be prevented.

Figure 8B:
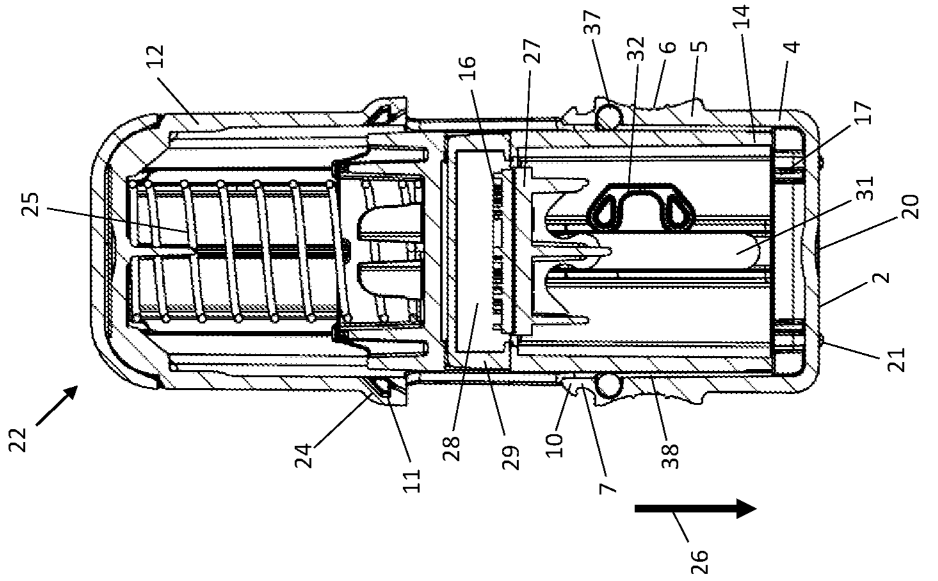
FIG. 8*a-b* show sectional illustrations of a further embodiment of a stamp device according to the invention in the closed position (FIG. 8*a*) and in the rest position (FIG. 8*b*).
Figure 8A:
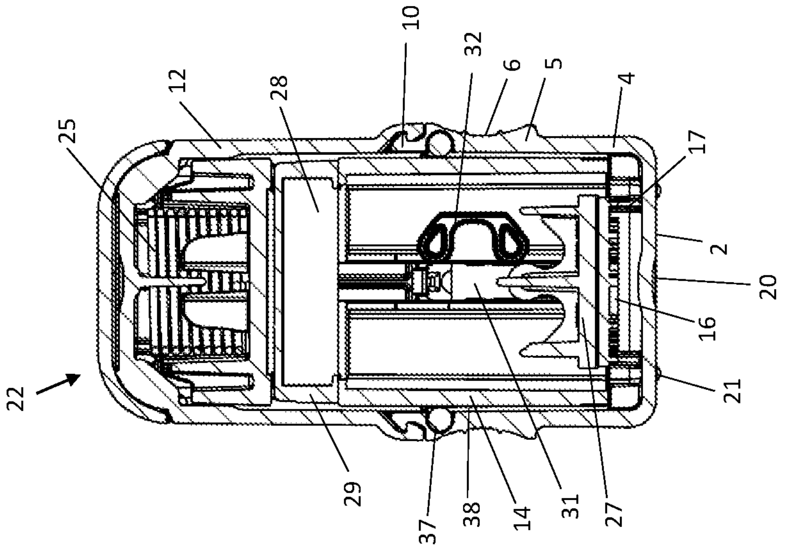

A stamp device 22 is illustrated in FIGS. 8*a-b* in the closed position (FIG. 8*a*) and in the rest position (FIG. 8*b*). This is similar to the stamp device 22 of FIGS. 2*a-d*, but it comprises rollers 37 on the rear sides of two latching elements 7 of the fixing device 1. The rollers 37 are arranged below exposed sections of both latching element 7 (as also illustrated in FIGS. 7*a-d*). Only a linear contact of the fixing device 1 with a self-inking stamp 3 takes place, namely between a height of the cylindrical rollers 37 and an outer side of a housing 14 of the self-inking stamp 3, which simplifies the removal. This results in the formation of a free space 38 between a section of the rear face of the latching element 7 or an inner face of a longitudinal side wall 4 of the fixing device 1 and the outer side of the housing 14. However, due to the high stiffness of the rollers 37, the latching elements 7 cannot easily and unintentionally come loose on their own due to the application of pressure and the associated deformation of the respective exposed sections of the latching elements 7.

The invention claimed is:

1. A stamp device comprising:

a self-inking stamp comprising:

an operating part, a housing, an imprinting unit, and a fixing device for fixing the self-inking stamp in a closed position, wherein the fixing device comprises a stop for a contact surface of the housing of the self-inking stamp and a latching element connected to the stop, wherein in the closed position, a front face of the latching element latches on an inner face of the operating part of the self-inking stamp, wherein in the closed position, the latching element rests with a rear face of the latching element opposite the inner face of the operating part, on the housing of the self-inking stamp fixed using the fixing device.

2. The stamp device according to claim 1, wherein the latching element comprises a latching hook.

3. The stamp device according to claim 1, wherein the rear face of the latching element comprises a support element.

4. The stamp device according to claim 3, wherein the support element is a support rib.

5. The stamp device according to claim 1, wherein the stop of the fixing device is configured as a covering surface for covering the contact surface of the housing of the self-inking stamp.

6. The stamp device according to claim 5, wherein the covering surface is provided for covering a trapezoidal contact surface of the housing of the self-inking stamp.

7. The stamp device according to claim 6, wherein the trapezoidal contact surface is rectangular.

8. The stamp device according to claim 1, wherein the fixing device comprises side walls which in the closed position terminate flush with side walls of the operating part of the self-inking stamp fixed using the fixing device.

9. The stamp device according to claim 1, wherein the fixing device comprises two opposing latching elements with rear faces facing each other.

10. The stamp device according to claim 1, wherein an operating element is provided between the stop of the fixing device for the contact surface of the housing of the self-inking stamp and the latching element.

11. The stamp device according to claim 1, wherein the housing of the self-inking stamp comprises a supporting element, on an outer side, the supporting element resting on the rear face of a latching element of the fixing device.

12. The stamp device according to claim 11, wherein the supporting element is a supporting rib.

* * * * *